March 6, 1973 R. E. OKELL ET AL 3,719,121
REDUCING APPARATUS AND METHOD

Filed June 5, 1970 2 Sheets-Sheet 1

INVENTORS.
ROY E. OKELL
KATHLEEN E. KIRKHAM
HAROLD KIRKHAM
BY
Seidel, Gonda & Goldhammer
ATTORNEYS.

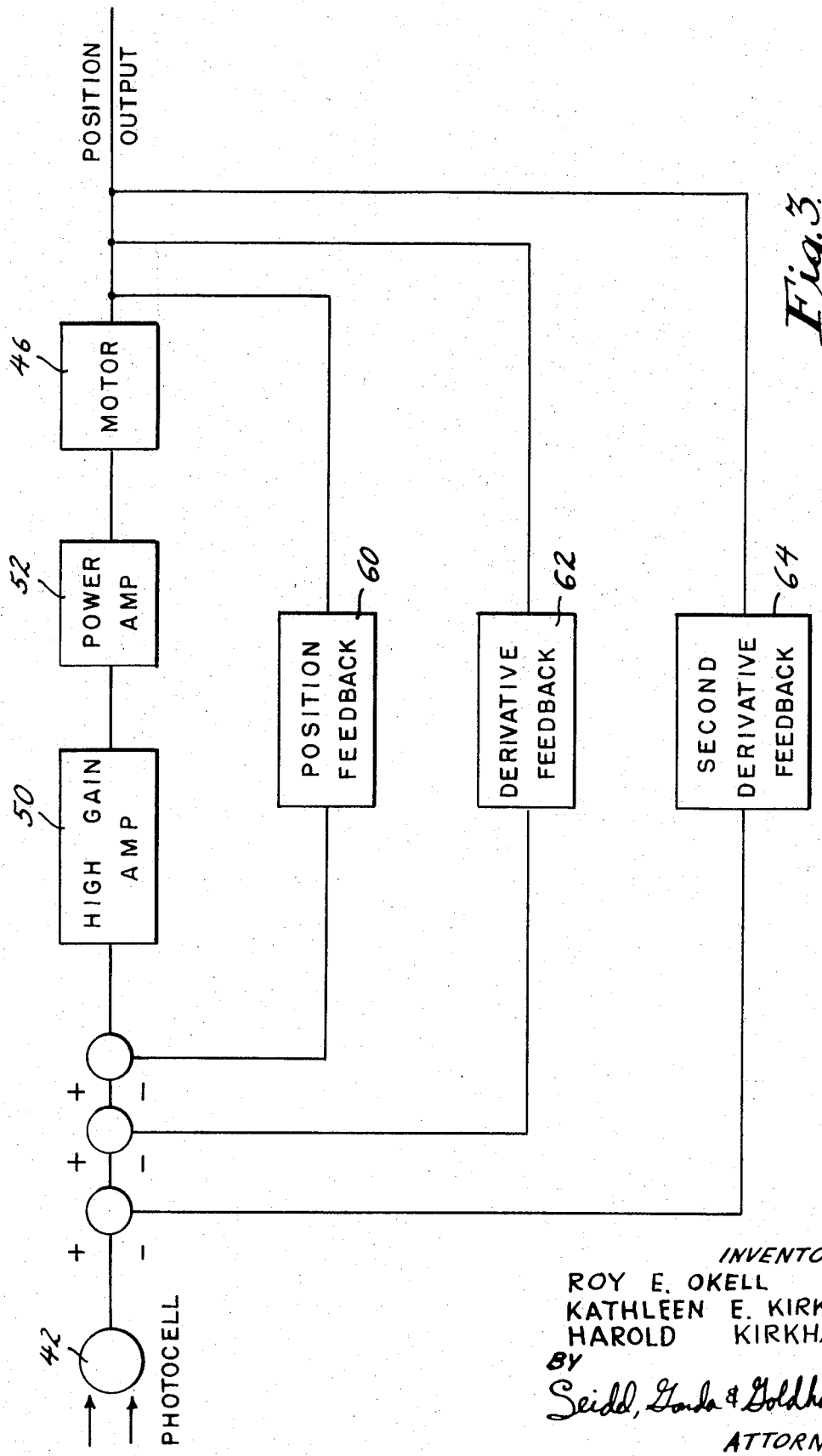

United States Patent Office 3,719,121
Patented Mar. 6, 1973

3,719,121
REDUCING APPARATUS AND METHOD
Roy E. Okell, Broomall, and Harold Kirkham and Kathleen E. Kirkham, Upper Darby, Pa., assignors to Franklin Mint Corporation, Yeadon, Pa.
Filed June 5, 1970, Ser. No. 43,897
Int. Cl. B23c 1/18
U.S. Cl. 90—13.7
8 Claims

ABSTRACT OF THE DISCLOSURE

Apparatus and method are disclosed for optically scanning a picture and reproducing a die of the picture on a reduced scale. The picture must have true shade depth.

DISCLOSURE

Heretofore, it has been conventional to make coining dies by performing a plurality of steps including sketching the subject matter on paper, making a clay model, making a plaster cast from the model, refining the details of the picture on the plaster cast, making a master of casting resin, and then reproducing the die from the master.

In accordance with the present invention, the coining die is made directly from the photograph or picture thereby eliminating several intermediate steps. In accordance with the present invention the picture is optically scanned to directly produce a three dimensional die. The optical scanner and die cutter are mounted on a common support. The common support is moved relative to the die by a motor means responsive to the optical scannner.

It is an object of the present invention to provide novel apparatus and method for optically scanning pictures and producing a die directly therefrom.

It is an object of the present invention to provide apparatus and method for simultaneously forming a die while scanning a picture to be reproduced in the die in three dimensions.

Other objects will appear hereinafter.

For the purpose of illustrating the invention, there is shown in the drawings a form which is presently preferred; it being understood, however, that this invention is not limited to the precise arrangements and instrumentalities shown.

FIG. 3 is a block circuit diagram.

Figure 1:
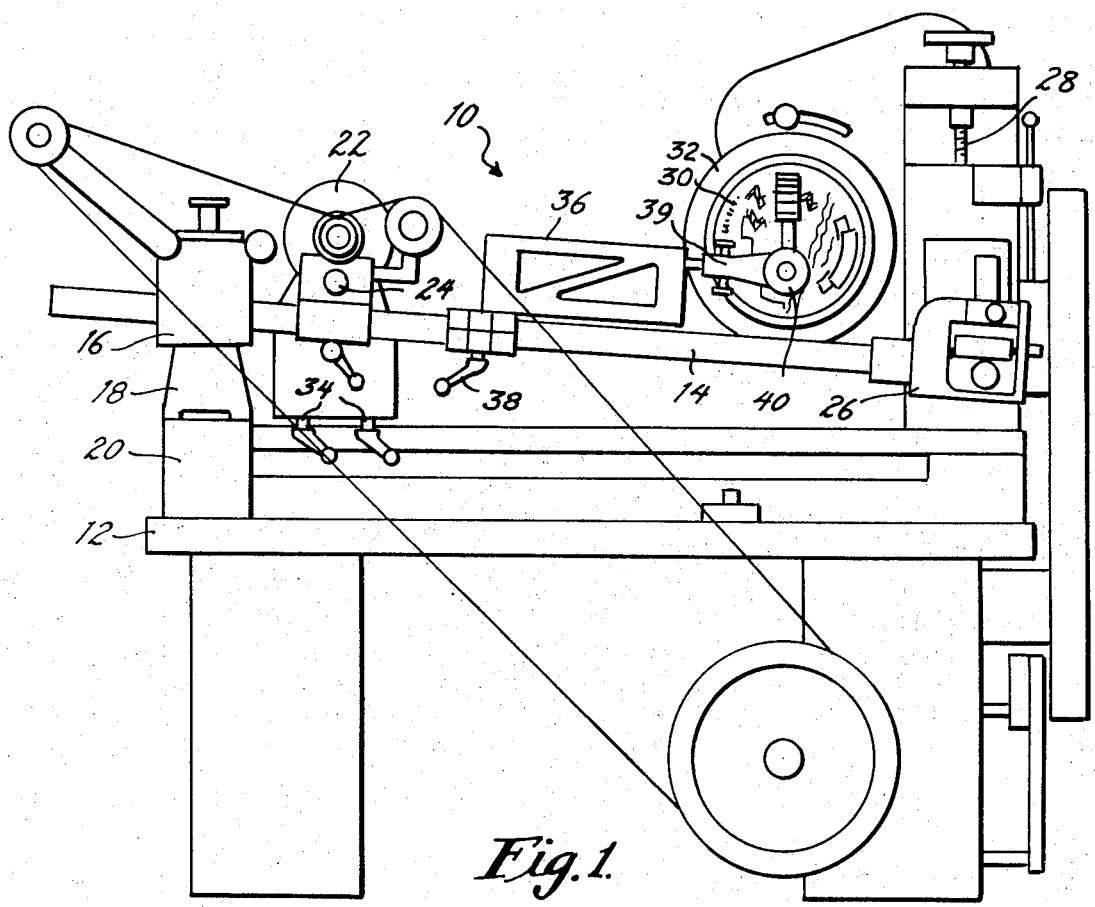
FIG. 1 is a side elevation view of apparatus used in accordance with the present invention.

Referring to the drawing in detail, wherein like numerals indicate like elements, there is shown in FIG. 1 a reducing machine in accordance with the present invention designated generally as 10. Machine 10 includes a frame 12 on which is supported an arm 14. Arm 14 has its left hand end portion in FIG. 1 pivotably supported by a universal joint 16 mounted on carriage 18. The carriage 18 is mounted on a way 20.

The die blank to be cut is designated as 22. A cutting tool 24 is supported by the arm 14. Cutting tool 24 may be a suitable conventional cutting tool such as an end face milling cutter The right hand end of arm 14 is connected to a yoke 26. The yoke 26 is connected to a lead screw 28 driven by a motor not shown. The lead screw 28 is rotated so as to cause the arm 14 to pivot in a clockwise direction in FIG. 1 in a manner whereby the cutting tool 24 will move from the center of the die blank 22 to a position approaching the periphery of the die blank 22. All of the above structure is conventional.

The picture to be reproduced is designated as 30 and is mounted on a rotating disc 32. Disc 32 rotates in the same direction and at the same angular speed as die blank 22 by means of a conventional motor not shown. The amount of reduction in size of picture 30 is a function of the distance between the axis of rotation of die blank 22 and picture 30. As this distance is increased, the reduction is increased and vice versa. The distance may be adjusted by turning handles 34 to release clamps (not shown) and reposition the die blank 22 and cutting tool 24 at any desired position along the arm 14.

A support 36 is adjustably positioned at any desired location along arm 14 by turning handles 28 to release clamps (not shown). Support 36 has a bracket 39 extending therefrom parallel to arm 14. Bracket 39 has mounted thereon an optical sensor designated generally as 40. The optical sensor 40 transduces variations in tone or depth of shade of the picture 30 into control signals for directing the movement of the cutting tool 24. Optical sensor 40 includes a phototransistor 42 and control circuitry.

Figure 4:
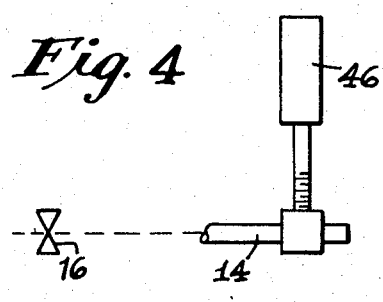
FIG. 4 is a partial top plan view taken along the line 4—4 in FIG. 2.

As the phototransistor 42 scans a picture 30, it generates an output proportional to the optical density of the particular part of the picture being scanned. This output is fed into the summing junction of a closed loop control circuit whose output drives a motor means 46 associated with arm 14 causing it to move in a direction into and out of the paper in FIGS. 1 and 2 thereby causing cutting tool 24 to cut the die 22. The motor means 46 may be an electric motor or a solenoid and may be physically coupled to arm 14 in any conventional manner such as that shown in FIG. 4.

Figure 2:
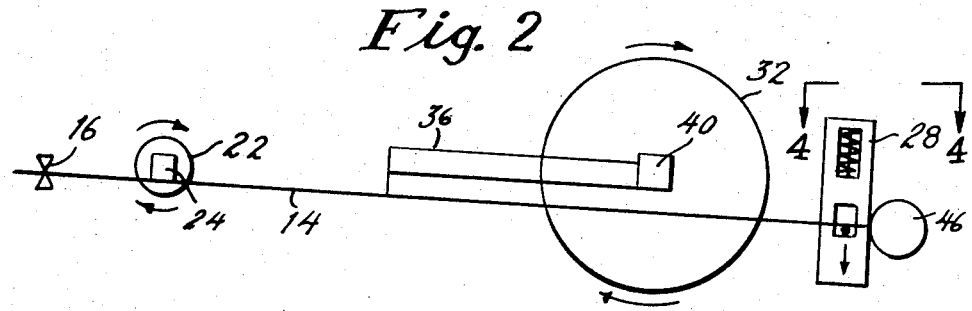
FIG. 2 is a diagrammatic illustration of the scanning movement supplied to the support for the die cutter and optical scanner.

FIG. 2 mechanically illustrates the functional operation of the various elements of the invention. As shown, the die 22 and picture 30 are rotating on their respective supports. Both rotate with the same angular velocity. The motor driven screw 28 and motor means 46 control the relative movement of the arm 14 with respect to the die 22. The combination of the foresaid element provides the necessary three dimensional movement to generate a relief pattern on the die 22.

The optical sensor 40 provides a control for the motor means 46 to move the arm 14 and hence the cutting tool 24 in a direction into and out of the paper. Stated otherwise, the rotation of the picture 30 and die 22 provides a first dimension of movement ($\theta$); the screw 28 provides a second radial dimension of movement ($r$); and the motor means 46 provides a third dimension of movement ($z$). Since $r$ and $\theta$ are determined, only $z$ need be controlled. This is accomplished by the servocontrol system illustrated in FIG. 3.

The servocontrol system is illustrated by the block diagram of FIG. 3. As related to the generation of a relief pattern on die 22 the dimension $z$ corresponds to depth. In a similar manner depth on the two dimensional picture 30 corresponds to optical density. It therefore follows that control of the cutting tool 24 by movement of the arm 14 depends upon generation of servocontrol signals corresponding to the optical density pattern sensed by the optical sensor 40 positioned in front of the rotating picture 30.

Referring to FIG. 3, the input to the servocontrol is derived from a photocell 42 in proportion to the instantaneous optical density of the picture being scanned. An error signal is generated by comparing the input signal with the feedback signals. This error signal is passed to a high gain voltage amplifier 50. The output of the high gain amplifier drives a stage of power amplification 52, whose output drives the torque motor 46, thereby causing the position of the arm 14 to change. There are three feedback signals shown. They are the position feedback 60, the first derivative of the position feedback signal 62 and the second derivative of the position 64. The position signal is obtained from a rotary potentiometer coupled to the torque motor. The first derivative signal is obtained electronically from the position signal; and the second derivative of the position signal is obtained by means of a feedback proportional to the motor current. Each of the feedback signals is fed to a summing junction as shown.

The present invention may be embodied in other specific forms without departing from the spirit or essential attributes thereof, and, accordingly, reference should be made to the appended claims, rather than to the foregoing specification as indicating the scope of the invention.

We claim:

1. A method of cutting die blanks comprising the steps of rotating a die blank and a depth shade picture in the same direction at the same angular velocity, optically scanning said rotating picture and generating output signals indicative of shade depth, cutting an end face of said die blank with a tool to reproduce said picture in three dimensions on said die blank, and moving the tool substantially radially across and toward and away from the end face of said die blank in response to said output signals.

2. A method in accordance with claim 1 including generating feedback signals of the position of a support for the die cutting tool and mixing the feedback signals with the output signals of an optical sensor scanning said picture.

3. Apparatus for cutting dies comprising means for supporting and rotating a die blank about an axis, means for supporting and rotating a flat depth shade picture in the same direction at the same speed about a different axis, means for optically scanning the picture, means for cutting an end face of said die blank, said cutting means and scanning means being mounted on a common support, and means for moving said support in a direction so that the cutting means moves substantially radially across and toward and away from the end face of said die blank as a function of the optical density of portions of the picture.

4. Apparatus in accordance with claim 3 wherein said common support is a lever arm, said lever arm and optical sensing means being coupled to an electrical circuitry including a servo-mechanism for moving said arm.

5. A method in accordance with claim 1 including the step of providing a common movable support for the optical sensor and the die cutting tool.

6. A method in accordance with claim 1 wherein said die blank and picture are rotated about horizontal parallel axes.

7. A method in accordance with claim 1 including reproducing said picture on said die blank on a smaller scale.

8. A method of cutting a die blank to reproduce in three dimensions the tone of a two dimensional picture comprising optically scanning a picture with a sensor and generating output signals indicative of shade depth, moving a cutting tool substantially radially across and toward and away from an end face of the die blank in response to an error signal, cutting the end face of said die blank with said tool to reproduce said picture in three dimensions on said blank, causing relative motion between the picture and the optical sensor, causing a similar relative motion between the cutting tool and the die blank, generating feedback signals of the position of a support for the cutting tool, and mixing the feedback signals with said output signals, to generate said error signal.

References Cited
UNITED STATES PATENTS

| | | | |
|---|---|---|---|
| 2,499,178 | 2/1950 | Berry et al. | 90—13 X |
| 2,047,013 | 7/1936 | Dorn | 90—13 C X |
| 3,065,554 | 11/1962 | Colabella, Jr. | 90—13 C X |
| 2,085,127 | 6/1937 | Sparkes | 90—13 C X |
| 3,128,337 | 4/1964 | Levine | 178—6.6 B |
| 2,824,905 | 2/1958 | Farber | 178—6.6 B |

GIL WEIDENFELD, Primary Examiner

U.S. Cl. X.R.

90—11 C; 178—6.6 B